(12) United States Patent
Lim et al.

(10) Patent No.: US 10,518,849 B2
(45) Date of Patent: Dec. 31, 2019

(54) FLOTATION SYSTEM FOR OFFSHORE POWER GENERATION PLATFORM

(71) Applicant: ALEN CO., LTD., Gyeongsangbuk-do (KR)

(72) Inventors: Hyug Lim, Gyeongsangnam-do (KR); Jae Yun Lim, Gyeongsangnam-do (KR); Cheol Lim, Gyeonggi-do (KR)

(73) Assignee: ALEN CO., LTD., Pohang-si (KR)

( * ) Notice: Subject to any disclaimer, the term of this patent is extended or adjusted under 35 U.S.C. 154(b) by 0 days.

(21) Appl. No.: 16/196,295

(22) Filed: Nov. 20, 2018

(65) Prior Publication Data
US 2019/0152568 A1    May 23, 2019

(30) Foreign Application Priority Data
Nov. 20, 2017  (KR) .................. 10-2017-0154750

(51) Int. Cl.
*B63B 35/44*      (2006.01)
*B63B 13/00*      (2006.01)
(Continued)

(52) U.S. Cl.
CPC ............... *B63B 35/44* (2013.01); *B63B 3/06* (2013.01); *B63B 5/20* (2013.01); *B63B 5/22* (2013.01);
(Continued)

(58) Field of Classification Search
CPC .............. B63B 2035/446; B63B 35/44; B63B 2207/02; B63B 2207/04; B63B 43/04;
(Continued)

(56) References Cited

U.S. PATENT DOCUMENTS

| | | | | |
|---|---|---|---|---|
| 4,766,836 A | * | 8/1988 | Behar ................. | B63B 9/065 |
| | | | | 114/256 |
| 8,899,881 B2 | * | 12/2014 | Finn .................. | B63B 21/50 |
| | | | | 405/200 |

(Continued)

FOREIGN PATENT DOCUMENTS

| | | |
|---|---|---|
| JP | P2009-248792 A | 10/2009 |
| KR | 10-0939821 B1 | 1/2010 |

(Continued)

*Primary Examiner* — Carib A Oquendo
(74) *Attorney, Agent, or Firm* — Goldilocks Zone IP Law

(57) ABSTRACT

A flotation system for an offshore power generation platform comprises: multiple buoyant bodies each containing a high-pressure air and ballast water therein to create buoyancy; connecting members connecting the multiple buoyant bodies to each other; ballast water flowing tubes through which the ballast water contained in the multiple buoyant bodies flows with respect to each other; a high-pressure tank supplying the high-pressure air into the multiple buoyant bodies; a compressor replenishing air pressure present in the high-pressure tank; an equilibrium sensor sensing an equilibrium state of each of the multiple buoyant bodies and transmitting a signal; and a controller controlling, in response to the signal from the equilibrium sensor, an amount of air supplied from the high-pressure tank to the buoyant body and an amount of air discharged from the buoyant body.

8 Claims, 7 Drawing Sheets

(51) Int. Cl.
*B63B 43/06* (2006.01)
*B63B 5/20* (2006.01)
*B63B 5/22* (2006.01)
*B63B 3/06* (2006.01)
*F03D 13/25* (2016.01)
*B63B 1/12* (2006.01)

(52) U.S. Cl.
CPC ............... *B63B 13/00* (2013.01); *B63B 43/06* (2013.01); *F03D 13/25* (2016.05); *B63B 2001/128* (2013.01); *B63B 2035/446* (2013.01); *B63B 2207/02* (2013.01); *B63B 2207/04* (2013.01); *F05B 2240/93* (2013.01); *F05B 2240/95* (2013.01); *Y02E 10/727* (2013.01); *Y02P 70/523* (2015.11)

(58) Field of Classification Search
CPC ....... B63B 43/06; Y02E 10/727; F03D 13/25; F05B 2240/93; F05B 2240/95; E02B 2017/0091
See application file for complete search history.

(56) References Cited

U.S. PATENT DOCUMENTS

| | | | |
|---|---|---|---|
| 2003/0140838 A1* | 7/2003 | Horton, III | B63B 9/065 114/264 |
| 2010/0150660 A1* | 6/2010 | Nadarajah | E02B 17/00 405/196 |
| 2011/0253023 A1* | 10/2011 | Tahar | B63B 35/4413 114/264 |
| 2015/0130191 A1* | 5/2015 | Houvener | F03B 11/00 290/1 A |
| 2015/0240442 A1* | 8/2015 | Garcia-Valdecasas Bernal | E02D 27/10 405/208 |
| 2016/0369780 A1* | 12/2016 | Aubault | F03D 13/25 |
| 2017/0001690 A1* | 1/2017 | Huenefeld | B63B 22/18 |
| 2018/0170488 A1* | 6/2018 | Fernandez Gomez | B63B 35/44 |
| 2019/0061884 A1* | 2/2019 | Lepreux | B63B 35/44 |

FOREIGN PATENT DOCUMENTS

| | | |
|---|---|---|
| KR | 1020110070133 A1 | 3/2012 |
| KR | 1020150124839 A1 | 11/2015 |
| KR | 1020170032574 A1 | 3/2017 |
| WO | WO 2009/131826 A2 | 10/2009 |

* cited by examiner

FLOTATION SYSTEM FOR OFFSHORE POWER GENERATION PLATFORM

CROSS REFERENCE

This application claims foreign priority under Paris Convention to Korean Patent Application No. 10-2017-0154750, filed 20 Nov. 2017, with the Korean Intellectual Property Office, entirety of which is incorporated herein by reference.

BACKGROUND

The present invention relates to a flotation system for an offshore power generation platform. More particularly, the present invention relates to a system of maintaining the structure and buoyancy of a buoyant body used in an offshore power generation platform upon wind power or solar power generation at an offshore location at sea.

In recent years, there have been increasing instances where an offshore structure using a buoyant body has been installed at sea.

Such floating structures are used in offshore plants, container terminals, petroleum stockpiling facilities, offshore parks, or the like, and the scale thereof is also increasing.

A floating structure is generally made of concrete and is a hollow rectangular parallelepiped-shaped structure. For structural efficiency of the floating structure, partition walls are generally mounted at regular intervals in an inner space thereof to define multiple hollow portions, and these hollow portions serve to create buoyancy of a buoyant body.

In the case of a typical concrete buoyant body, when cracks occur, seawater penetrates into the buoyant body due to water pressure, leading to a reduction in buoyancy. This can lead to a problem that the buoyant body may fail to serve as a stable buoyant body.

In an effort to solve such a problem, a buoyancy maintaining method of floating a concrete structure as disclosed in Patent Document 1 (Korean Patent No. 10-0939821, issued on Feb. 2, 2010) includes an air bag mounted with a bag portion provided inside a hollow portion of the floating concrete structure and with an air inlet tube extending from the bag portion outwardly of the hollow portion for injecting air into the bag portion, wherein the air is injected into the air bag such that air pressure greater than at least draft pressure is introduced into the bag portion, and the bag portion is made larger in size than at least the hollow portion made in a standard size whereby the bag portion is brought into close contact with the inner surface of the hollow portion due to the air pressure introduced into the bag portion.

Furthermore, a floating wind turbine platform as disclosed in Patent Document 2 (PCT Publication No. WO 2009/131826, published Oct. 29, 2009) regarding as a system for a floating offshore wind power generation includes: a) at least three stabilizing columns, each column having an upper and a lower end, and an internal volume for containing a ballast fluid; b) a tower having an upper end and a lower end that is coupled to the floating wind turbine platform; c) a turbine rotor coupled to an electrical generator, the turbine rotor and the electrical generator are mounted proximate to the upper end of the tower; d) main beams interconnected to the at least three stabilizing columns; e) water-entrapment plates, each of the plates attached to the lower end of one of the stabilizing columns; and f) a ballast control system for moving the ballast fluid between the internal volumes of the at least three stabilizing columns to adjust a vertical alignment of the tower.

However, an outer wall of a buoyant body of Patent Document 1 is composed of a considerably thick concrete wall and thus is difficult to be transported to an offshore location. Furthermore, when cracks occur in the concrete wall, compressed air is supplemented into the air bag to prevent seawater from penetrating into the buoyant body. However, this may not effectively cope with a situation where the equilibrium between multiple buoyant bodies floating on the sea surface is upset due to continuous wind or storms. Additionally, Patent Document 1 has a structure in which air pressure corresponding to the draft pressure is injected, leading to a problem that the buoyant body is required to be extremely large in scale to stably float a large and heavy structure.

Meanwhile, in Patent Document 2, as a method for maintaining equilibrium between multiple buoyant bodies (columns) when the equilibrium therebetween is upset due to continuous wind, the ballast fluid is used to flow between each of the stabilizing columns, thus maintaining the equilibrium between the buoyant bodies.

However, the method for maintaining equilibrium in Patent Document 2 is problematic in that since the flow of the ballast fluid is achieved through control of the flow rate of the ballast fluid by using a pump mounted in each of the stabilizing columns, the pump is required to have a very large capacity and thus is large in size, heavy in weight, and slows in responsiveness, leading to a reduction in efficiency.

SUMMARY OF THE INVENTION

Accordingly, the present invention has been made keeping in mind the above problems occurring in the related art, and an objective of the present invention is to provide a flotation system for an offshore power generation platform, the system being capable of reducing an overall weight of a buoyant body while maintaining strength thereof against water pressure, thus facilitating transportation to an offshore location at sea.

Another objective of the present invention is to provide a flotation system for an offshore power generation platform, the system being relatively simple in structure and thus being capable of maintaining equilibrium between buoyant bodies even when the equilibrium is upset due to sea breeze or wind wave.

Yet another objective of the present invention is to provide a flotation system for an offshore power generation platform, the system enabling easy manufacturing, mass manufacturing, and easy replacement and repair of parts.

In order to accomplish the above objectives, according to one aspect of the present invention, there is provided a flotation system for an offshore power generation platform, the system comprising: multiple buoyant bodies each containing a high-pressure air and ballast water therein to create buoyancy; connecting members connecting the multiple buoyant bodies and a platform to each other, the platform on which a power generation facility is provided; ballast water flowing tubes through which the ballast water contained in the multiple buoyant bodies flows with respect to each other; a high-pressure tank supplying the high-pressure air into the multiple buoyant bodies; a compressor replenishing air pressure present in the high-pressure tank; an equilibrium sensor sensing an equilibrium state of each of the multiple buoyant bodies and transmitting a signal; a pressure sensor sensing pressure present in each of the multiple buoyant bodies and transmitting a signal; and a controller 800 controlling, in response to the signals from the equilibrium sensor and the pressure sensor, an amount of air supplied from the high-pressure tank 400 to the buoyant body where the buoyancy is required to increase and an amount of air discharged from the buoyant body where the buoyancy is required to decrease to outside, wherein the controller, when a signal is received from the equilibrium sensor, the signal indicating that one of the multiple buoyant bodies is relatively lowered than a different one of the buoyant bodies and thus equilibrium therbetween is upset, estimates the pressure present in the one of the buoyant bodies to supply the high-pressure air thereinto until the estimated pressure is reached, causing the ballast water contained in the one of the buoyant bodies to flow into the different one of the buoyant bodies, the controller estimating the pressure present in the different one of the buoyant bodies into which the ballast water is introduced to discharge the high-pressure air therefrom until the estimated pressure is reached, whereby the equilibrium between the multiple buoyant bodies is maintained.

Herein, the buoyant body may include: a bellows drum having a space defined therein, the space in which the high-pressure air and the ballast water are contained together; a ballast water inlet/outlet to which each of the ballast water flowing tubes through which the ballast water flows is connected; a high-pressure air inlet having an air inlet valve mounted thereat through which the high-pressure air is introduced from the high-pressure tank; an air outlet having an air outlet valve mounted thereat through which the air contained in the buoyant body is discharged; a sealing plate covering and sealing each upper and lower surface of the bellows drum; and a cover plate covering the sealing plate and to which each of the connecting members is secured.

Meanwhile, the power generation facility may be provided at a center of gravity of a geometrical figure defined by lines virtually connecting central portions of the multiple buoyant bodies to each other.

Herein, the geometrical figure defined by the lines virtually connecting the central portions of the multiple buoyant bodies may be an equilateral triangle, and a wind power tower may be erected vertically at an outer center of the equilateral triangle.

Furthermore, the bellows drum may be configured such that a bellows thereof is vertical bellows having a multilayer structure in which ridges and troughs are vertically formed and multiple reinforcement rings are provided at regular intervals in a height direction, the reinforcement rings and the bellows being welded together.

Conversely, the bellows drum may be configured such that a bellows thereof is a horizontal bellows having a circumferentially divided structure in which ridges and troughs are horizontally formed, and multiple reinforcement plates are circumferentially provided at regular intervals, the reinforcement plates and the bellows being welded together.

Furthermore, the bellows drum may be configured such that concrete or a foaming agent is applied on an outer surface thereof to provide surface protection and prevent surface corrosion.

According to the flotation system for the offshore power generation platform according to the present invention having the above configuration, it is possible to achieve a weight reduction of the entire system and enable easy manufacturing while sufficiently securing a required strength. Additionally, maintaining equilibrium between the buoyant bodies can be achieved through the relatively simple structure of the system, thus providing a quick responsiveness and reliably ensuring maintenance of equilibrium. Moreover, it is possible to enable easy replacement and repair of parts after long-term use.

DETAILED DESCRIPTION OF THE INVENTION

Reference will now be made in greater detail to an exemplary embodiment of the present invention, an example of which is illustrated in the accompanying drawings.

Figure 1:
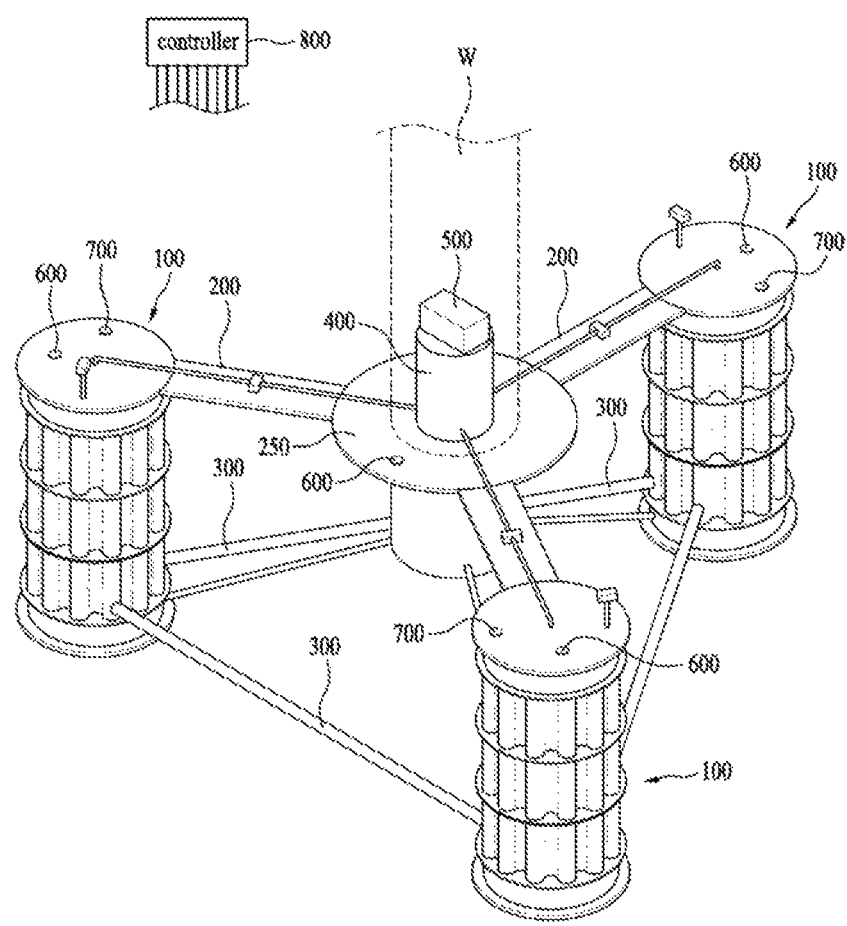
FIG. 1 is a perspective view showing a system of an offshore power generation platform according to an embodiment of the present invention.

FIG. 1 is a schematic perspective view showing an overall configuration of a flotation system for an offshore power generation platform according to the present invention.

Although FIG. 1 shows a simplified main configuration of the system to facilitate understanding, the system is a huge structure in which a wind power generation facility having a diameter of approximately 10 m and a height of several tens of meters is mounted on the platform, and an interval between buoyant bodies is several tens of meters.

Furthermore, various facilities, work vehicles, and the like are loaded onto the system according to the present invention. Although not shown in the drawings, there are provided anchors for securing systems to the floor of the seabed.

Furthermore, FIG. 1 exemplarily shows that a wind power generation facility W is provided on a circular platform. However, the present invention is not limited thereto, and a solar power generation facility may be provided thereon. It should be noted that the illustration and the description of various configurations relating to the power generation facility are omitted unless the power generation facility is the subject of the present invention.

The system shown in FIG. 1 is configured such that three buoyant bodies 100 are interconnected with various structures of a platform 250. The three buoyant bodies 100 are arranged such that central portions thereof are virtually connected to each other by lines defining an equilateral triangle. However, the number of the buoyant bodies 100 according to the present invention may vary, such as three, four, five, or more buoyant bodies.

In the system shown in FIG. 1, the three buoyant bodies 100 are arranged in an equilateral triangle configuration defined by the lines virtually connecting the central portions thereof to each other, and the power generation facility W is positioned at the outer center (center of gravity) of the equilateral triangle. However, the present invention is not limited thereto, the platform 250 may be provided on any one of the buoyant bodies 100 and the power generation facility may be provided thereon.

As shown in FIG. 1, the flotation system for the offshore power generation platform according to an embodiment of the present invention includes: three buoyant bodies 100 each containing a high pressure-air A and ballast water B therein to create buoyancy; connecting members 200 connecting upper and lower ends of the three buoyant bodies 100 to each other such that the buoyant bodies and the platform 250 on which the wind power generation facility W is provided are connected to each other; three ballast water flowing tubes 300 through which the ballast water B contained in the three buoyant bodies 100 flows with respect to each other; a high-pressure tank 400 supplying the high-pressure air A into the three buoyant bodies 100 and positioned in an inner space of the wind power generation facility W; a compressor 500 replenishing air pressure present in the high-pressure tank 400; an equilibrium sensor 600 sensing an equilibrium state of each of the three buoyant bodies 100 and transmitting a sensing signal; a pressure sensor 700 sensing pressure present in each of the buoyant bodies 100 and transmitting a sensing signal; and a controller 800 controlling, in response to the signals from the equilibrium sensor 600 and the pressure sensor 700, a valve mounted in each pipe to control the amount of air supplied from the high-pressure tank 400 to the buoyant body 100 and the amount of air discharged from the inside of the buoyant body 100 to the outside.

The system according to the present invention differs from Patent document 1, which uses a pump for flowing ballast water, in that the high-pressure air is injected into the buoyant body to increase the pressure present therein, causing flow of the ballast water whereby equilibrium between the buoyant bodies is maintained. This is one of the main features of the system according to the present invention.

The high-pressure tank 400 according to the present invention is configured such that the interior thereof is always maintained at a high pressure state due to the high-pressure air, and when a valve is opened, the high-pressure air is introduced into each buoyant body.

Figure 2:
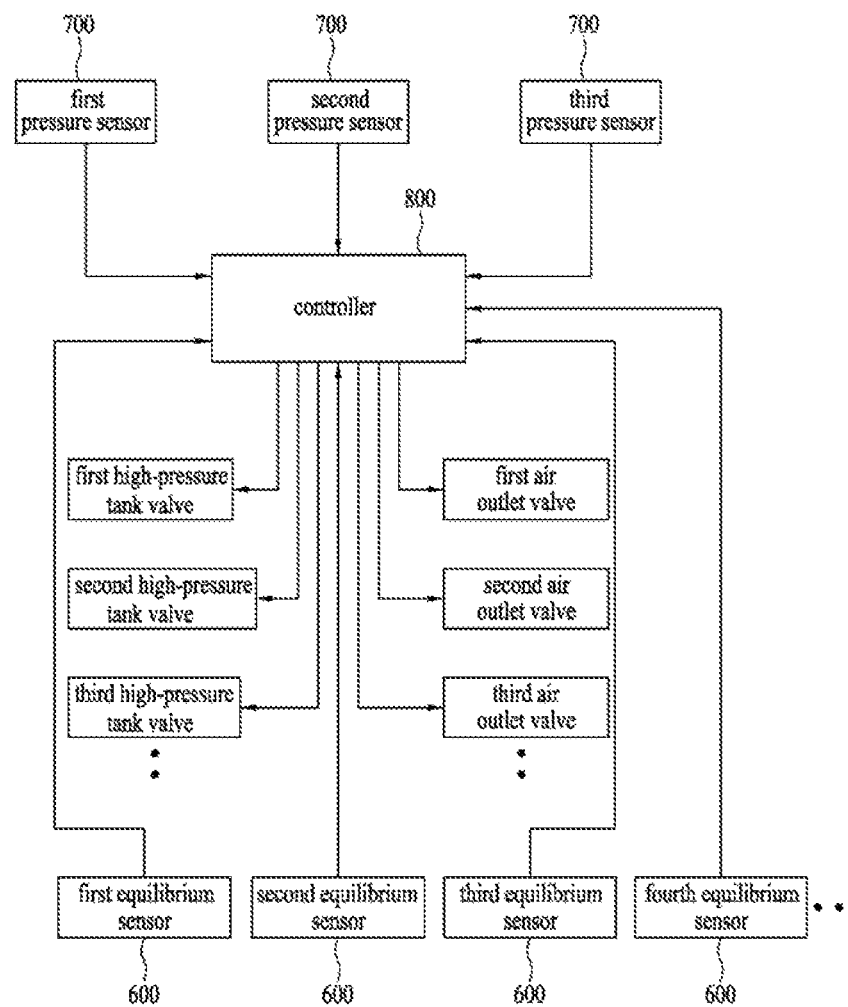
FIG. 2 is a block diagram showing a function of a controller according to the embodiment of the present invention.

In the flotation system for the offshore power generation platform shown in FIG. 1, a mechanism of maintaining equilibrium between the buoyant bodies according to the flow of the ballast water will be described with reference to FIG. 2.

The equilibrium sensor 600 uses a three-axis acceleration sensor and is provided individually for each buoyant body (referred to as a first equilibrium sensor, a second equilibrium sensor, and a third equilibrium sensor), and is also provided on the platform 250 (an equilibrium sensor attached on the platform 250 will be referred to as a forth equilibrium sensor).

In order to maintain equilibrium between the buoyant bodies, it is important to sense not only the inclination of each buoyant body but also the inclination of the platform 250. The sensing of the inclination of the platform allows an overall equilibrium state of the buoyant bodies to be more accurately ascertained.

The acceleration sensor senses the inclination of each of the buoyant bodies 100 and the inclination of the platform 250 and transmits sensing signals to the controller 800.

The control unit 800 receives signals related to equilibrium from the equilibrium sensors 600 mounted on the buoyant bodies 100 and the platform 250 and when it is determined that the equilibrium is upset, allows the high-pressure air A to be supplied into a lowered buoyant body according to a value calculated by a central processing unit of the controller 800 and allows the high-pressure air A contained in a raised buoyant body to be discharged.

Herein, the lowered buoyant body is a buoyant body requiring buoyancy, and the relatively raised buoyant body is a buoyant body requiring decreased buoyancy.

In other words, the high-pressure air is injected into the buoyant body where buoyancy is required to increase, while the high-pressure air contained in the buoyant body where buoyancy is required to be decreased is discharged to the outside, thus maintaining equilibrium between the buoyant bodies.

Each of the buoyant bodies 100 has the pressure sensor 700 mounted therein, the pressure sensor sensing air pressure present in the buoyant body 100 to transmit the sensing signal to the controller 800.

The controller 800 receives the signals from the equilibrium sensors and the signals from the pressure sensors and estimates and calculates the amount of high-pressure air and the amount of discharged air to drive related valves.

The amount of high-pressure air and the amount of discharged air are controlled by the central processing unit of the controller, such that pressure present in the buoyant body which is required for increasing and decreasing buoyancy is estimated, and the high-pressure air is injected or discharged until the estimated pressure is reached.

In this process, the pressure sensors 700 continuously transmit pressure information sensed in real time to the controller 800.

The controller 800 controls supply of the high-pressure air A into the lowered buoyant body by opening a valve (high-pressure tank valve) of a pipe extending from the high-pressure tank 400 toward the buoyant body 100 and controls discharge of the high-pressure air from the raised buoyant body by opening an air outlet valve provided at an air outlet 140 of the buoyant body.

In other words, the system is controlled such that when wind blows for a certain period of time, one of the buoyant bodies 100 is relatively lowered while a different one of the buoyant bodies is relatively raised and thus when equilibrium is upset, air is supplied into the lowered buoyant body so as to be increased in buoyancy, and the raised buoyant body is decreased in buoyancy, whereby it is possible to maintain equilibrium between the buoyant bodies.

Herein, the air outlet valve of the buoyant body where supply of the high-pressure air is required has to be maintained in a closed state to increase buoyancy.

When the high-pressure tank valve is opened, the high-pressure air A contained in the high-pressure tank 400, which always maintains higher than the pressure present in the buoyant body 100, is introduced into the lowered buoyant body, causing the ballast water B contained therein to flow into the raised buoyant body. When the air outlet valve is opened, the high-pressure air A contained in the raised buoyant body into which the ballast water B has flowed is discharged to the outside through the air outlet 140. As a result, it is possible for the buoyant bodies 100 to be maintained in equilibrium with each other.

In this process, the respective the equilibrium sensors 600 and the respective pressure sensors 700 continuously transmit the signals related to the equilibrium states and the pressure to the controller 800, and the controller 800 continuously estimates required pressure present in the buoyant bodies to control the amount of air to be introduced and discharged.

The pressure present in the high-pressure tank 400 is set to always be much larger than the pressure of the high-pressure air A contained in the buoyant body.

For example, the pressure present in the buoyant body 100 is usually 3 atm, and the pressure present in the high-pressure tank 400 is usually 10 atm. Accordingly, when the high-pressure tank valve is opened, a pressure difference therebetween causes the high-pressure air A to be naturally introduced into the buoyant body 100 from the high-pressure tank 400.

When the high-pressure air A is supplied from the high-pressure tank 400 into a desired buoyant body 100, a predetermined pressure present in the high-pressure tank 400 is lowered. Herein, a compressor 500 operates to allow compressed air to be introduced into the high-pressure tank 400 such that the pressure present in the high-pressure tank 400 is always maintained at the predetermined pressure.

Figure 3:
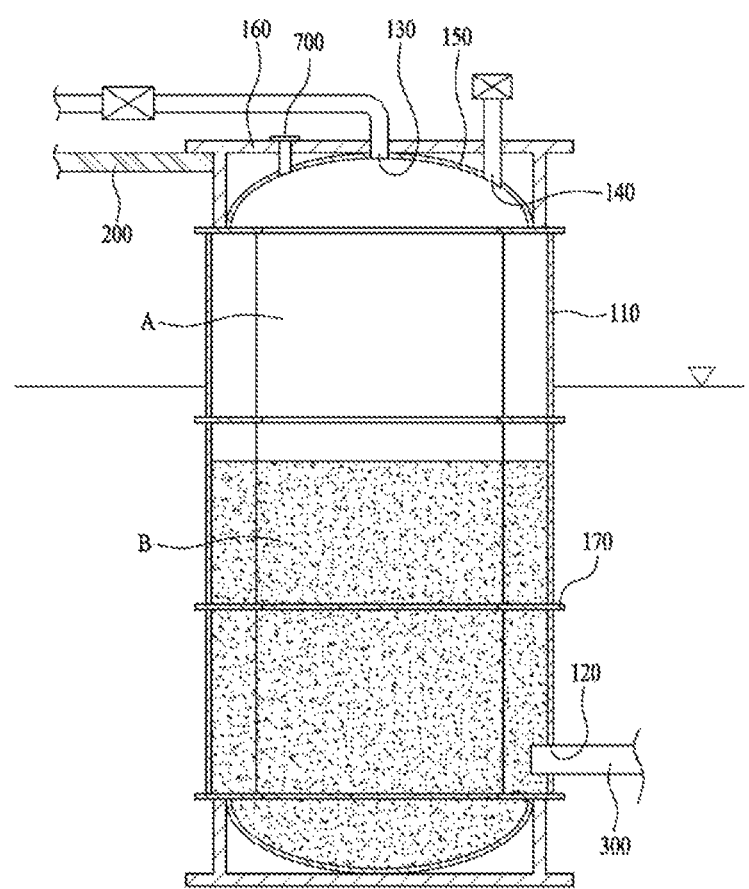
FIG. 3 is a sectional view showing a buoyant body according to the embodiment of the present invention.
Figure 4:
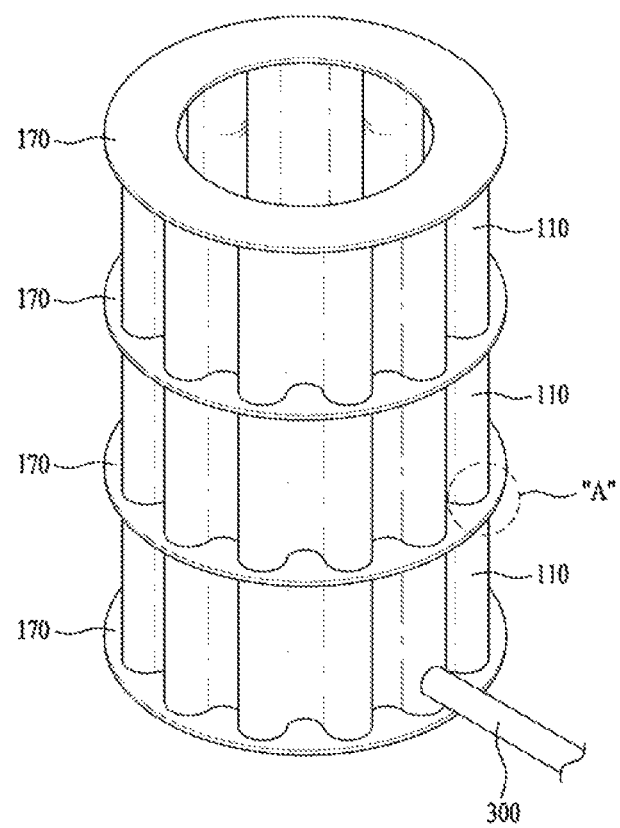
FIG. 4 is a perspective view showing a vertical bellows drum according to the embodiment of the present invention.
Figure 5:
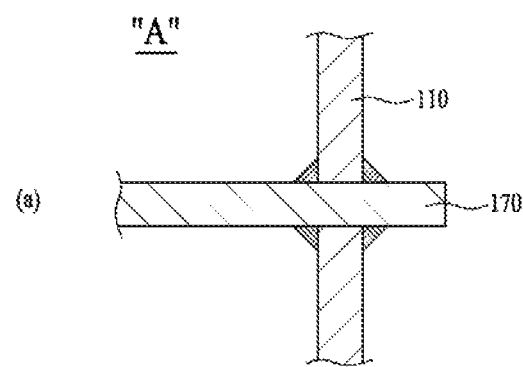
FIG. 5 is an enlarged view showing a portion A of FIG. 4.
Figure 5:
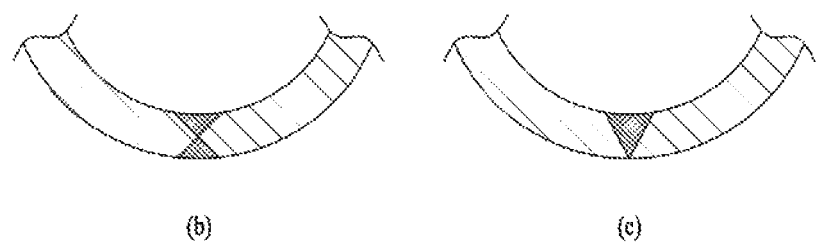

FIG. 3 is a sectional view showing a configuration of the buoyant body shown in FIG. 1, FIG. 4 is a perspective view showing an appearance of a bellows drum 110 of the buoyant body shown in FIG. 3, and FIG. 5(a) is a main part cross-sectional view showing welding portions at the time of manufacture of the bellows drum.

The buoyant body 100 shown in FIG. 3 includes: the bellows drum 110 having a space defined therein, the space in which the high-pressure air A and the ballast water B are contained together; a ballast water inlet/outlet 120 to which each of the ballast water flowing tubes 300 through which the ballast water B flows is connected; a high-pressure air inlet 130 having an air inlet valve mounted thereat, the air inlet valve through which the high-pressure air A is introduced from the high-pressure tank 400; the air outlet 140 having the air outlet valve mounted thereat through which the air contained in the buoyant body is discharged; a sealing plate 150 covering and sealing each upper and lower surface of the bellows drum 110; and a cover plate 160 covering the sealing plate 150 and to which each of the connecting members 200 connecting the respective buoyant bodies 100 is secured.

The configuration and operation of the buoyant bodies 100 are described above, so a description thereof will not be repeated. The bellows drum 110 will be described in detail below.

The bellows drum 100 shown in FIG. 4 is configured such that a bellows thereof is a vertical bellows having a multi-layer structure in which ridges and troughs are having vertically formed, and multiple reinforcement rings 170 are provided at regular intervals in a height direction. The reinforcement rings 170 and horizontal surfaces of the bellows are welded together.

The term "vertical bellows" as used herein denotes a configuration in which each ridge and each trough are continuous vertically and have a substantially sunflower shape in a plan view.

The bellows can be referred to as a corrugated tube, and a sectional area thereof is wider than that of a tube having no corrugation. This leads to a reduction in load per unit area, making it possible for the bellows to withstand a relatively large load.

The system according to the present invention differs from the related art in that the high-pressure air pressure is much larger than the atmospheric pressure is used as air creating buoyancy of the buoyant body so as to reduce a difference between external water pressure and air pressure present in the buoyant body and thus reduce deformation of the buoyant body. Thus, it is concluded that a bellows shape is the most preferable in order to exert such strength by using a relatively thin steel plate.

Furthermore, the vertical bellows as described above is slightly weaker to a load applied in a transverse direction in strength than a load applied in the height direction. Due to this, the ring-shaped reinforcement rings 170 are adapted to be provided on the horizontal surfaces of the bellows.

Furthermore, for convenience of manufacture, the bellows drum 110 may be mass manufactured in a shape in which bellows tubes each having a predetermined height are manufactured and the bellows tubes are stacked on top of each other by welding together with the reinforcement rings 170 interposed therebetween.

FIG. 5(a) is a main part cross-sectional view showing a portion A of FIG. 4, which shows welding portions.

As shown in FIG. 5(a) which is the cross-sectional view showing the portion A, a cross section of the bellows tube and a reinforcement ring 170 can be welded together while being arranged in a direction perpendicular to each other. Thus, unlike butt welding, it is possible to provide sufficient strength by welding four points of intersection between the bellows tube and the reinforcement ring.

As can be seen from comparison views of FIGS. 5(b) and 5(c), in the case where the bellows drum 110 is integrally manufactured as a single bellows tube without provision of the reinforcement rings 170, only butt welding in the height direction is possible. In this case, a base material must be subjected to machining into a V- or X-shape for welding, leading to an increase in number of processes.

Figure 6:
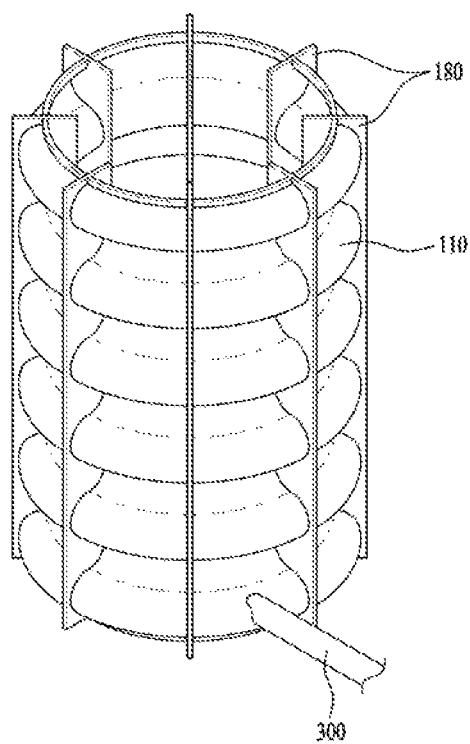
FIG. 6 is a perspective view showing a horizontal bellows drum according to another embodiment of the present invention.

FIG. 6 is a perspective view showing a horizontal bellows drum 110 as compared to the vertical bellows shown in FIG. 3.

The horizontal bellows drum 110 shown in FIG. 6 is configured such that a bellows tube is divided into multiple bellows tubes arranged in a circumferential direction (circumferentially divided structure) unlike the vertical bellows drum 110 shown in FIG. 3, and the bellows tubes are secured to each other by welding together with reinforcement plates 180 interposed therebetween.

The horizontal bellows drum 110 shown in FIG. 6 is configured such that a bellows thereof is a horizontal bellows in which ridges and troughs are horizontally formed. The horizontal bellow drum may have high strength against the load applied in the transverse direction while having relatively low strength against the load applied in the height direction. Due to this, the reinforcement plates 180 are adapted to reinforce the strength. Furthermore, the reinforcement plates 180 and the bellows tube are in contact with each other vertically, making it possible to facilitate welding as described above and thus to enable mass manufacturing and reduce the number of processes.

Figure 7:
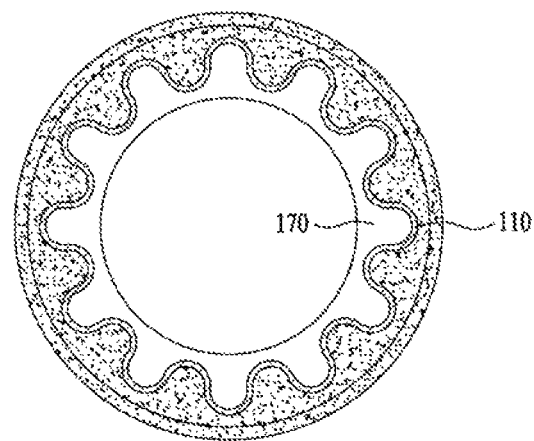
FIG. 7 is a plan view showing a bellows drum according to yet another embodiment of the present invention.

FIG. 7 is a plan view showing a cylindrical bellows drum 110 formed by applying concrete on an outer surface of the bellows drum 110 shown in FIG. 4.

The buoyant body 100 is always immersed at a certain depth in seawater and thus may undergo surface corrosion due to seawater after decades of use, leading to a reduction in strength. Due to this, concrete application is adapted to prevent such surface corrosion and to replace expensive corrosion resistant paints.

Furthermore, a forming agent may be applied on the outer surface of the buoyant body to finish the outer surface, thus preventing surface corrosion of the buoyant body and increasing buoyancy.

Although the preferred embodiment of the flotation system for the offshore power generation platform according to the present invention have been disclosed for illustrative purposes, the embodiment of the present invention is merely representative for purposes of helping more comprehensive understanding of the present invention and is not intended to limit the scope and spirit of the present invention.

It should be understood that those skilled in the art will appreciate that various modifications, additions and substitutions are possible, without departing from the scope and spirit of the invention as disclosed in the accompanying claims.

For example, the system according to the present invention may have various power generation facilities such as a wind power generation facility, a solar power generation facility, and the like mounted for offshore power generation. The power generation facility may be mounted on any one of multiple buoyant bodies as well as being mounted at a position corresponding to the center of gravity of a geometrical figure defined by lines connecting central portion of the buoyant bodies to each other. The ballast water may be various liquids as well as pure water. The positions or types of various valves may not be limited. The equilibrium sensor may vary in type and mounting position as long as the equilibrium sensor is a sensor which can sense equilibrium, such as a gyroscope, as well as being the three-axis acceleration sensor.

What is claimed is:

1. A flotation system for an offshore power generation platform, the system being used in offshore wind power generation and the like and comprising: multiple buoyant bodies (100) each containing a high-pressure air (A) and ballast water (B) therein to create buoyancy;
   connecting members (200) connecting the multiple buoyant bodies (100) and a platform (250) to each other, the platform on which a power generation facility is provided;
   ballast water flowing tubes (300) connect the multiple buoyant bodies to allow the ballast water (B) contained in the multiple buoyant bodies (100) to move between the multiple bouyant bodies;
   a high-pressure tank (400) supplying the high-pressure air (A) into the multiple buoyant bodies (100);
   a compressor (500) replenishing air pressure present in the high-pressure tank (400);
   an equilibrium sensor (600) sensing an equilibrium state of each of the multiple buoyant bodies (100) and transmitting a signal;
   a pressure sensor (700) sensing pressure present in each of the multiple buoyant bodies (100) and transmitting a signal; and
   a controller (800) controlling, in response to the signals from the equilibrium sensor (600) and the pressure sensor (700), an amount of air supplied from the high-pressure tank (400) to the buoyant body (100) where the buoyancy is required to increase and an amount of air discharged from the buoyant body (100) where the buoyancy is required to decrease to outside, wherein the controller (800), when a signal is received from the equilibrium sensor (600), the signal indicating that one of the multiple buoyant bodies (100) is relatively lowered than a different one of the buoyant bodies and thus equilibrium therebetween is upset, estimates the pressure present in the one of the buoyant bodies to supply the high-pressure air (A) thereinto until the estimated pressure is reached, causing the ballast water (B) contained in the one of the buoyant bodies to flow into the different one of the buoyant bodies, the controller estimating the pressure present in the different one of the buoyant bodies into which the ballast water (B) is introduced to discharge the high-pressure air (A) therefrom until the estimated pressure is reached, whereby the equilibrium between the multiple buoyant bodies is maintained.

2. The system of claim 1, wherein the buoyant body (100) includes: a bellows drum (110) having a space defined therein, the space in which the high-pressure air (A) and the ballast water (B) are contained together; a ballast water inlet/outlet (120) to which each of the ballast water flowing tubes (300) through which the ballast water (B) flows is connected; a high-pressure air inlet (130) having an air inlet valve mounted thereat through which the high-pressure air (A) is introduced from the high-pressure tank (400); an air outlet (140) having an air outlet valve mounted thereat through which the air contained in the buoyant body is discharged; a sealing plate (150) covering and sealing each upper and lower surface of the bellows drum (110); and a cover plate (160) covering the sealing plate (150) and to which each of the connecting members (200) is secured.

3. The system of claim 2, wherein the power generation facility (W) is provided at a center of gravity of a geometrical figure defined by lines virtually connecting central portions of the multiple buoyant bodies (100) to each other.

4. The system of claim 3, wherein the geometrical figure defined by the lines connecting the central portions of the multiple buoyant bodies is an equilateral triangle, and a wind power tower is erected vertically at an outer center of the equilateral triangle.

5. The system of claim 2, wherein the bellows drum (100) is configured such that a bellows thereof is vertical bellows having a multi-layer structure in which ridges and troughs are vertically formed and multiple reinforcement rings (170) are provided at regular intervals in a height direction, the reinforcement rings (170) and the bellows being welded together.

6. The system of claim 2, wherein the bellows drum (100) is configured such that a bellows thereof is a horizontal bellows having a circumferentially divided structure in which ridges and troughs are horizontally formed, and multiple reinforcement plates (180) are circumferentially provided at regular intervals, the reinforcement plates and the bellows being welded together.

7. The system of claim 5, wherein the bellows drum (110) is configured such that concrete or a foaming agent is applied on an outer surface thereof.

8. The system of claim 6, wherein the bellows drum (110) is configured such that concrete or a foaming agent is applied on an outer surface thereof.

* * * * *